United States Patent [19]

Glasgow

[11] 4,157,140
[45] Jun. 5, 1979

[54] RETRACTABLE AUTOMATIC SELF-ADJUSTING CLAMPING MEANS

[76] Inventor: Paul J. Glasgow, 886 Lakeside Dr., Woodmere, N.Y. 11598

[21] Appl. No.: 860,127

[22] Filed: Dec. 13, 1977

[51] Int. Cl.² ............................................. B65G 7/06
[52] U.S. Cl. ..................................... 414/676; 156/99; 156/580; 269/289 R
[58] Field of Search ................ 214/1 BE; 269/289 R, 269/321 F; 156/99, 580

[56] References Cited

U.S. PATENT DOCUMENTS 3,807,720  4/1974  Converse ..................... 269/321 F X

FOREIGN PATENT DOCUMENTS 1962965  6/1971  Fed. Rep. of Germany ........... 269/289

Primary Examiner—Albert J. Makay
Assistant Examiner—George F. Abraham
Attorney, Agent, or Firm—Stoll and Stoll

[57] ABSTRACT

Retractable clamping means for clamping sheet laminates and other forms of work upon the work supporting surface of a table, said clamping means being retractable to inoperative storing position below said work supporting surface, and being movable to operative clamping position above the work supporting surface. In the preferred form of the invention, the clamping means operates upon two adjacent sides of rectangular workpieces in each clamping operation, and the workpieces are rotated 180 degrees on the work supporting surface to enable the clamping means to operate upon the remaining two sides of the workpieces. To facilitate handling of the workpieces, the table used in conjunction with the clamping means embodies air or other fluid float means.

12 Claims, 18 Drawing Figures

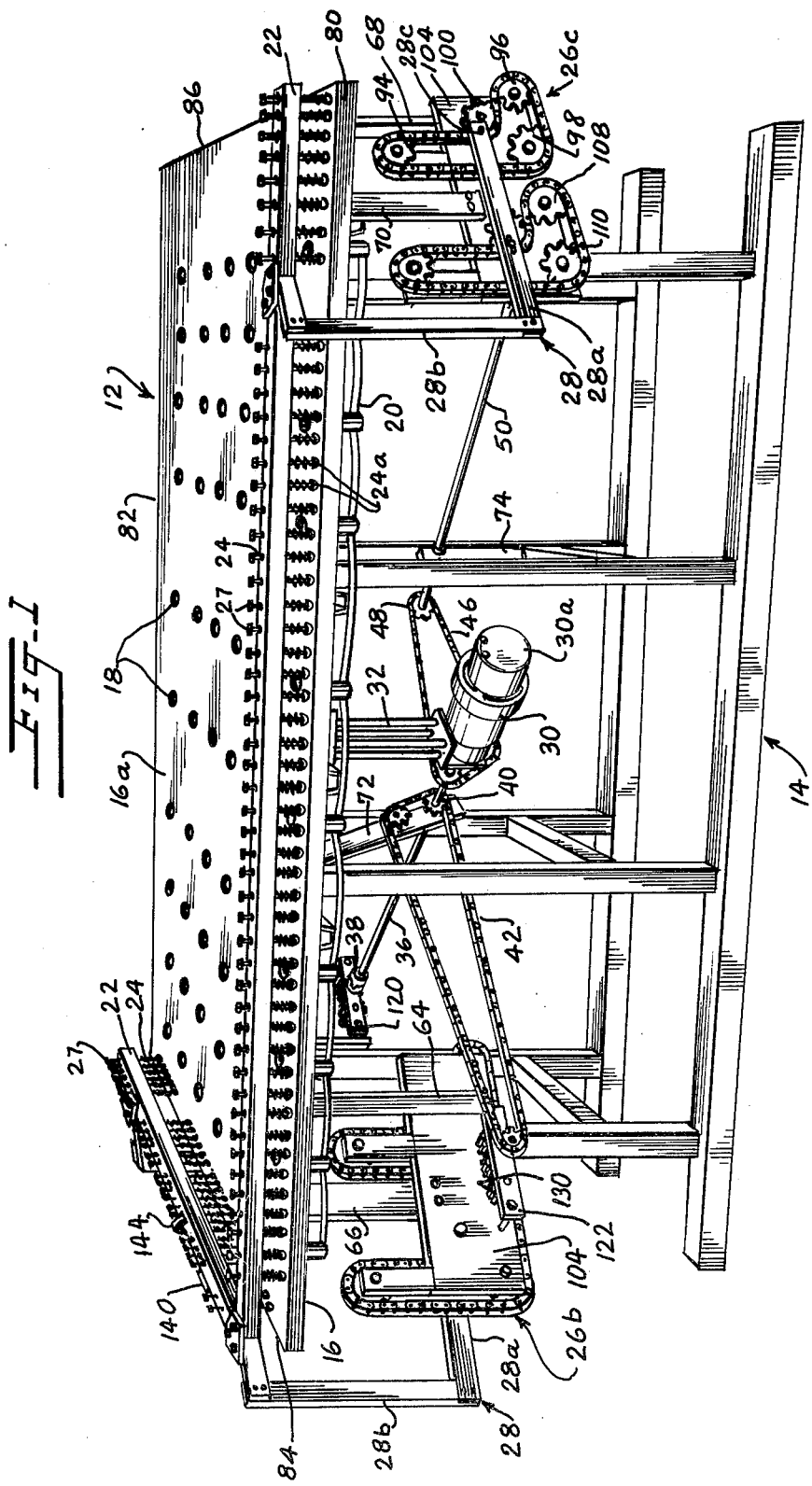

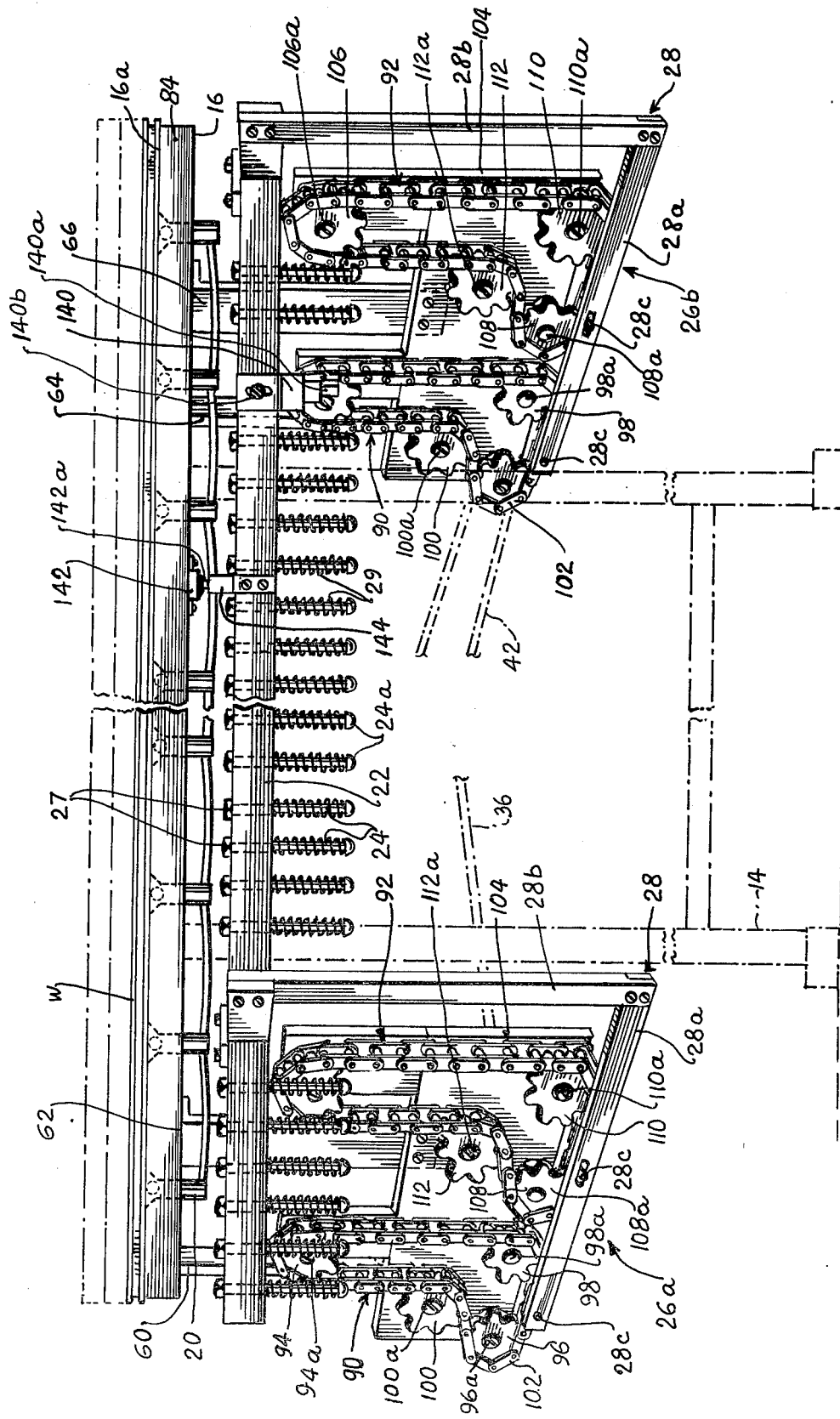

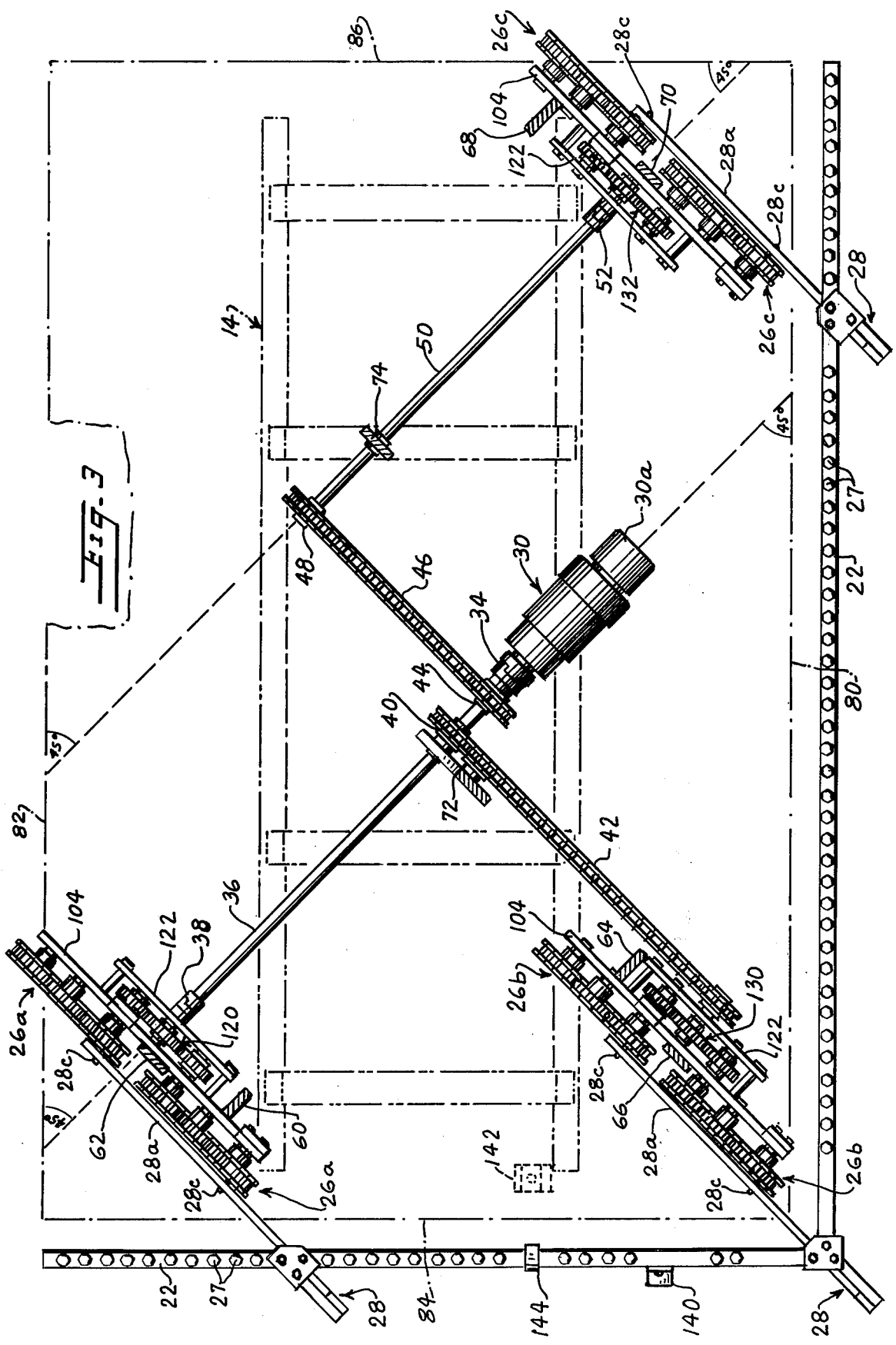

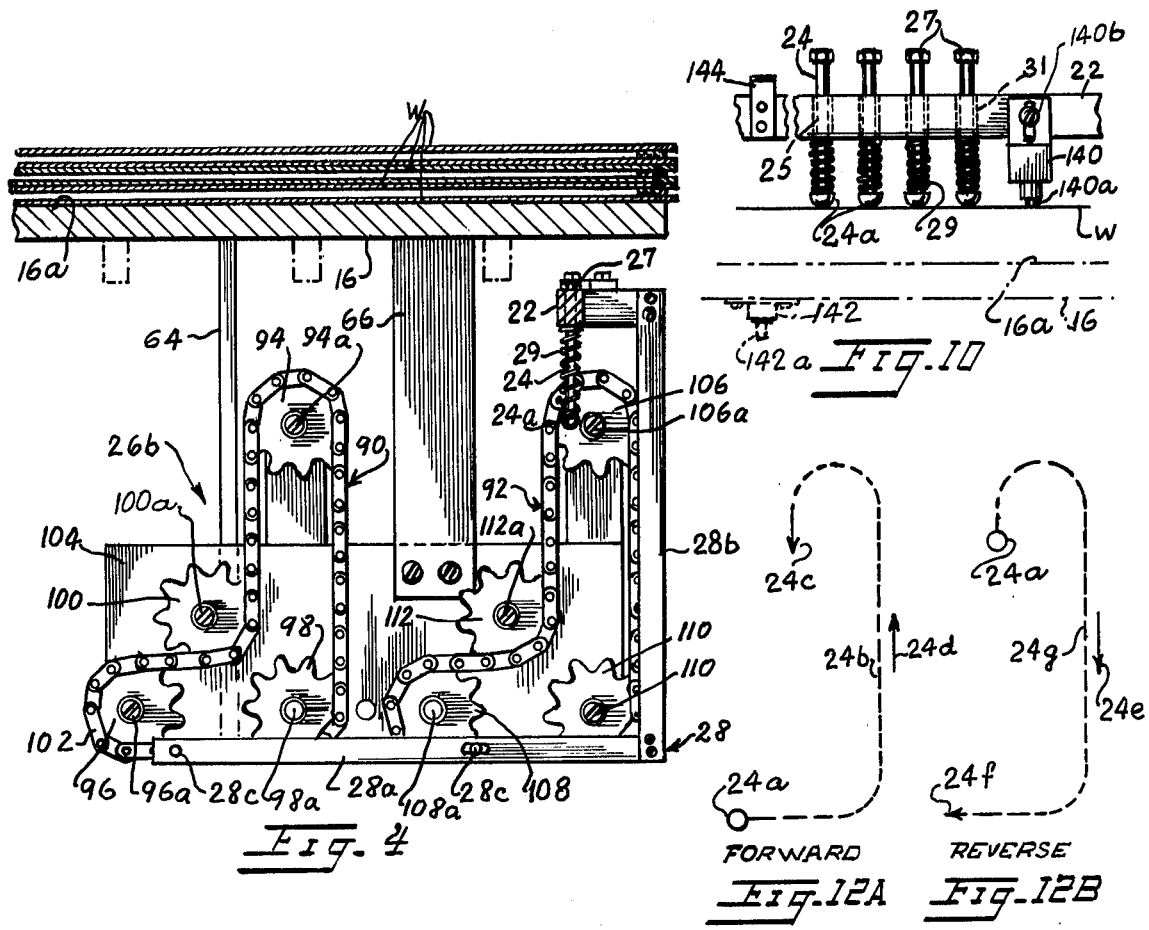
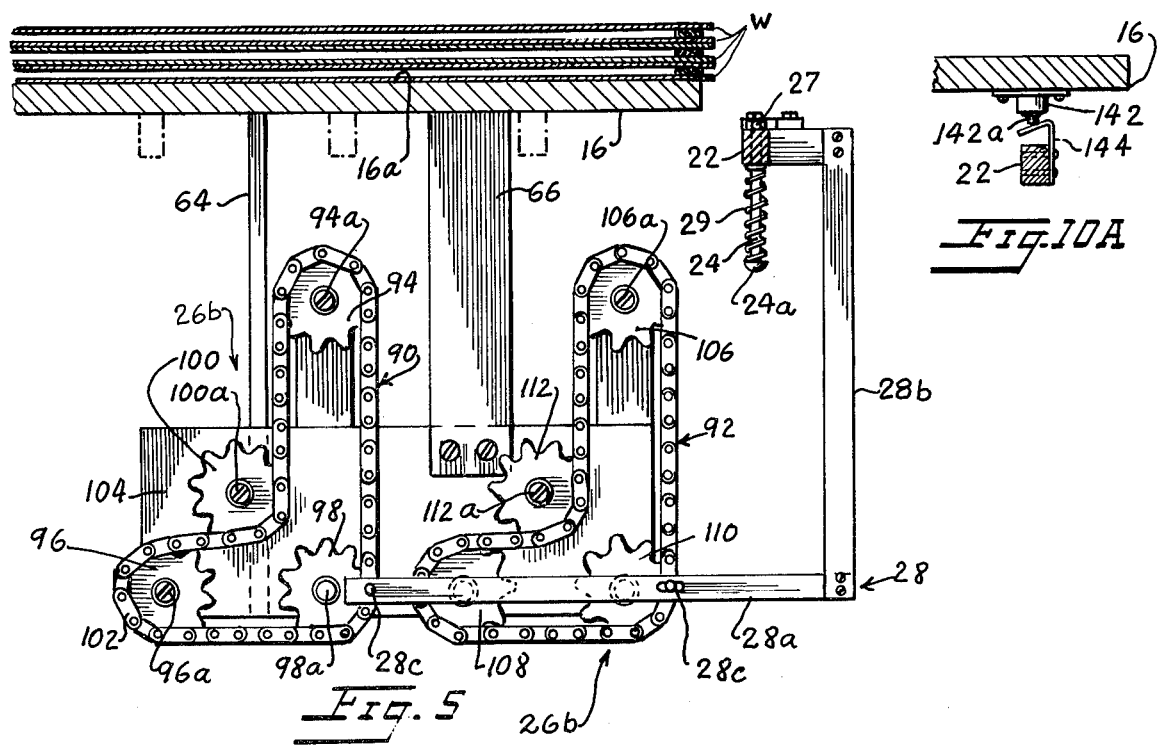

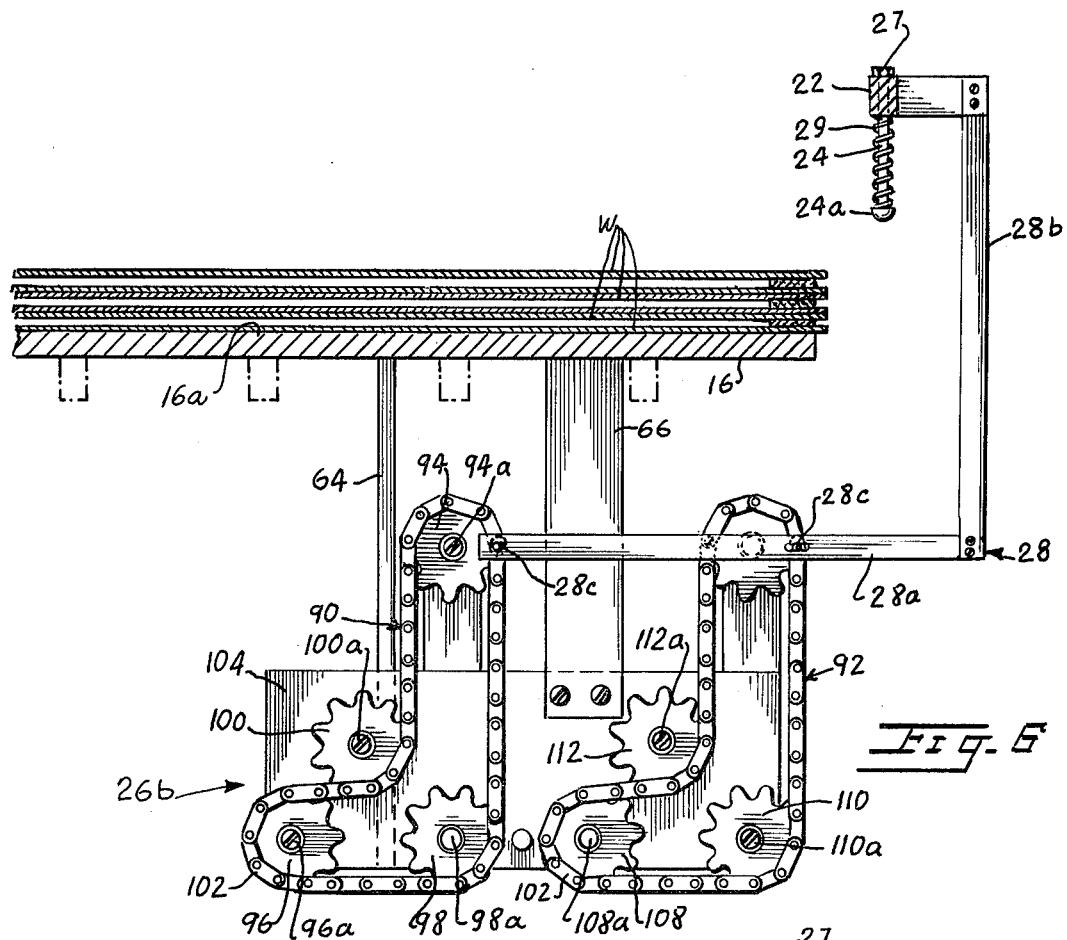
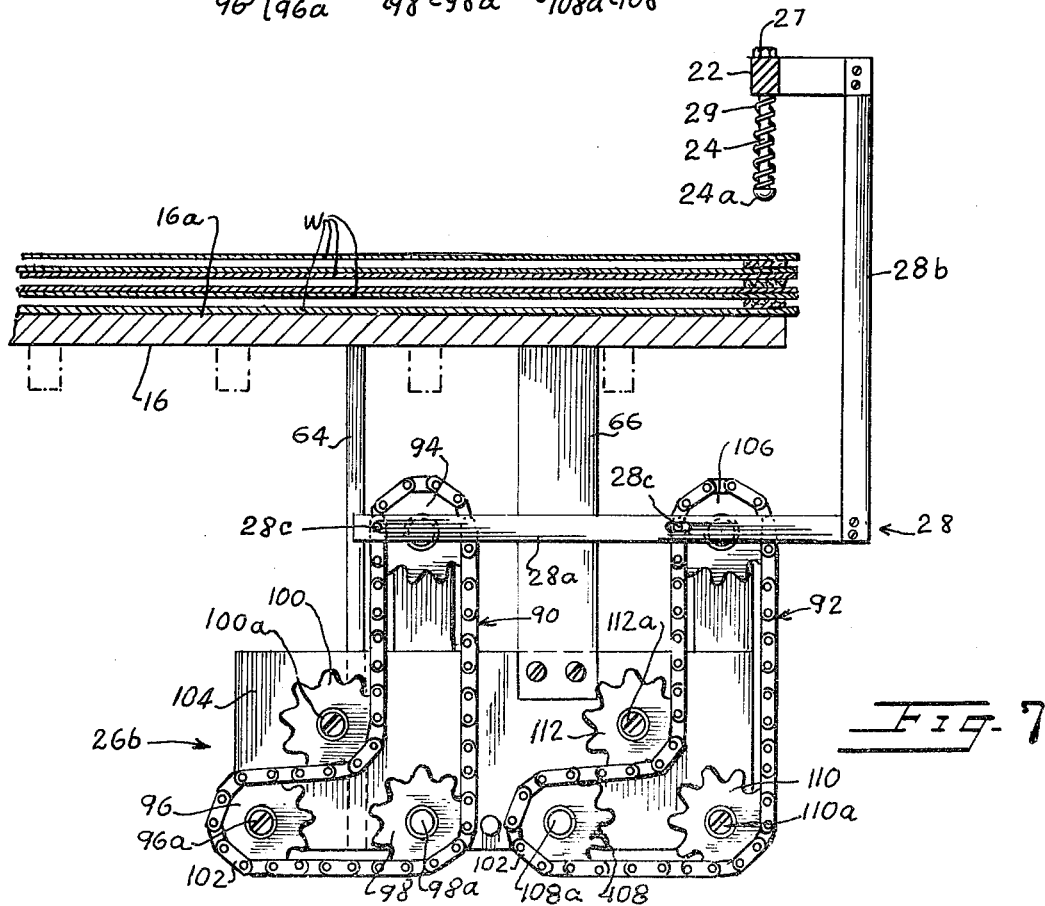

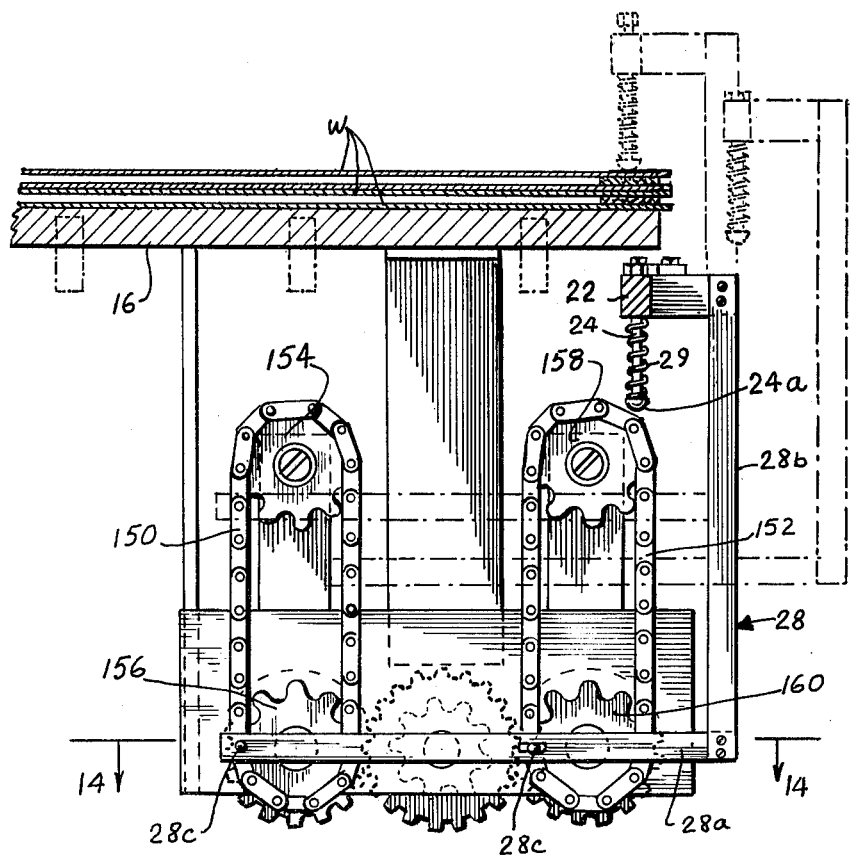
Fig. 13
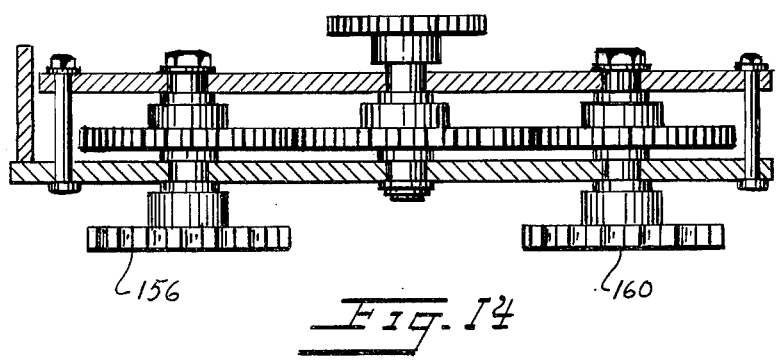
Fig. 14
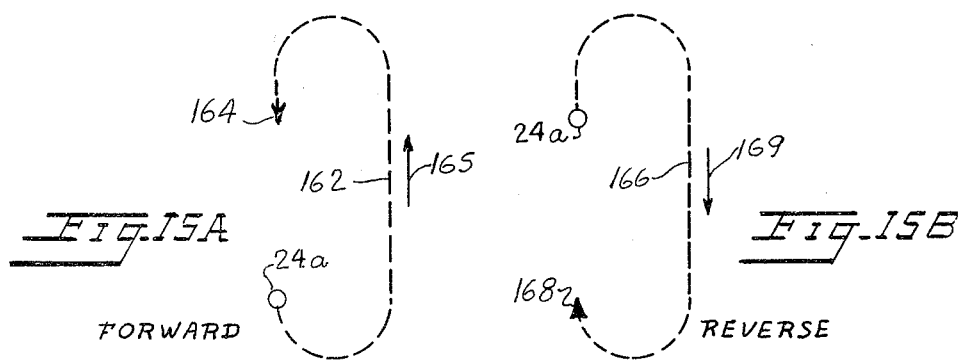
Fig. 15A  FORWARD        Fig. 15B  REVERSE

RETRACTABLE AUTOMATIC SELF-ADJUSTING CLAMPING MEANS

BACKGROUND OF THE INVENTION

1. Field of the Invention

This invention relates to clamping means for clamping sheet laminates and other forms of work. The invention is used, for example, in the manufacture of laminated thermally insulated glass windows and doors and other sheet-laminated structures.

2. Description of the Prior Art

Applicant knows of no closely related prior art. The common and conventional practice in the fields of application of this invention is to load the work with weights. This is done manually and different pressures are applied by using different weights.

Applicant has been informed that a pneumatic clamping mechanism was at one time devised and used but it was not found to be practical and its use was discontinued. Applicant has not seen this device but has been informed that it was suspended from an overhead support, namely the ceiling, and that it included pneumatic cylinders operating work clamping plungers. One of the problems with this device was its very presence above the work supporting surface of the table; it interfered with work handling operations.

SUMMARY OF THE INVENTION

This invention provides mechanically operated, electrically controlled work clamping means for clamping sheet laminates and other forms of work. For example, it may be applied to the manufacture of laminated, thermally insulated glass assemblies for window and door construction. Each such thermally insulated glass unit comprises two usually, but not necessarily, rectangular sheets of glass separated by peripheral spacers. It is necessary to adhesively secure or bond the glass sheets to the peripheral spacers and this requires the application of controlled pressure to hold the assembly together during the bonding operation and to supply adequate clamping force on the sandwich laminate to prevent inward bowing of the intermediate spacer during the sealing and bonding operation. The present invention makes it possible to laminate a plurality of such glass assemblies stacked one upon another. By way of illustration, the invention may be applied to as many as six, eight or more stacked glass assemblies in a single laminating operation.

One principal feature of the present invention resides in the retractability of the clamping means herein described and claimed. The clamping means are retractable to inoperative storing positions below the work supporting surface of the table. When the clamping means are in this position they are entirely out of the way of the work supporting surface and all work handling operations may take place without any interference from the clamping means. When the work is properly stacked on the work supporting surface of the table, the clamping means are caused to move out from under the table and then to operative clamping position above the work supporting surface and the stacked work supported thereon. This procedure is an electrically powered mechanical operation which applies a pre-determined clamping force to the work independent of size of sheets involved up to the maximum size of table top. Specifically, the clamping force is applied to two adjacent sides of the work in a single clamping operation. It is then necessary to release the clamping means, retract the clamping means from the operating surface of the table, and to rotate the work to present the remaining two sides of the work to the clamping means which is then brought into operative position for a second clamping operation.

It will be understood from the foregoing that the clamping means which are herein described and claimed are provided in an L-shaped configuration, in plan view, to enable the clamping means to engage two adjacent sides of rectangular workpieces concurrently. This arrangement makes it possible to clamp adjacent sides of rectangular workpieces of various dimensions within the limitations of the dimensions of the L-shaped clamping means. For example, L-shaped clamping means extending four feet along one end of the table and eight feet along an adjacent side of the table will accommodate rectangular workpieces in various sizes up to four feet wide and eight feet long. These sizes are for example only and the geometry of the table top and mechanism may be enlarged or contracted, at will, to accommodate the preferential size or sizes.

A very important aspect of the invention resides in the orientation of the path of movement of the L-shaped clamping means relative to the work supporting surface of the table. Specifically, the L-shaped structure of the clamping means coincides with the L-shaped configuration which is defined by the two corresponding sides of the table. By way of clarification, it may be assumed that the table defines a rectangle having corners a, b, c and d respectively. The front of the table is side ab, the right side is side bc, the back is side cd and the left side is side da. The L-shaped clamping structure has a left side da and a front side ab. The path of horizontal movement of the L-shaped structure coincides with the 45 degree bisecting line which bisects right angle dab of both the table and the L-shaped structure. The effect of such 45 degree movement is to move arm da of the L-shaped structure laterally relative to side da of the table and to move arm ab of the L-shaped structure laterally relative to side ab of the table. In short, movement along a single line results in movement of the L-shaped structure into and out of clamping position relative to the corresponding sides of the table and the workpieces on the table.

At the conclusion of the first clamping operation wherein two adjacent sides of multi-layer workpieces are clamped and bonded together, the clamping means may be disengaged from the workpieces, the workpiece may be horizontally rotated 180 degrees, and the remaining two sides thereof may now be engaged and clamped by the very same L-shaped clamping means. It is thus possible by the use of the present invention to clamp all four sides of rectangular multi-layer workpieces in two operations.

To facilitate rotating the workpieces from their initial clamping position to their second clamping position, it is desirable to utilize an air float or other fluid float table. A table of this type provides a pressurized air or other fluid cushion for sheet material such as glass or plastics in sheet form, and facilitates handling operations, including rotating a stack of workpieces in sheet form from the initial clamping position above mentioned to the second clamping position 180 degrees removed from the first.

The invention also provides pressure control for adjusting the clamping force exerted by the clamping means. The pressure control automatically senses the height of the work stack of laminates and automatically exerts a uniform unit clamping force independent of the size of the laminates or the height of the stack. Specifically, the clamping means comprises a plurality of spring biased plungers which are mounted on an L-shaped floating framework, and means for driving said floating framework into and out of clamping position. The individual spring biased plungers are each adjustable independently of the others, but a single adjusting means is provided for all. Consequently, a single adjustment controls the clamping force exerted by each and all of the spring biased plungers.

The driving means is an electric motor with a speed reducing gear train. Associated with the electric motor is a spring biased, solenoid controlled brake. The solenoid is normally de-energized so that the brake is normally applied. When the motor is energized to drive the floating framework, the solenoid is energized to disengage the brake.

The single control which concurrently adjusts all of the spring biased plungers is an adjustable limit switch, connected with the floating framework for engagement with the work, which controls the motor and solenoid circuits. When the clamping means engages the work at a pre-determined clamping force, the limit switch is actuated, thereby de-energizing both the motor and the solenoid and applying the brake to retain that force. At the conclusion of the clamping (i.e., laminating) operation the solenoid is re-energized, as is the motor (reversed), thereby disengaging the brake and returning the clamping means to its initial (storing) position below the work supporting surface of the table. The amount of repeatable force exerted upon the work in the clamping operation may be adjusted by adjusting the position of the limit switch.

A second limit switch is also provided in order to stop the clamping means in the retracted storing position. This second limit switch de-energizes the motor and the solenoid and re-engages the brake. The storing position of the clamping means may be varied by adjusting the position of the second limit switch.

The foregoing is, of course, illustrative of the invention and not intended to limit its scope, application or method of operation. The L-shaped configuration of the clamping means is the preferred configuration because of its versatility and flexibility. For example, it may be used for linear clamping alone, as along only one side of the work. It may be used for concurrent clamping of two adjacent sides, as above described. And it may also be used for concurrent clamping of two adjacent sides, as above described. And it may also be used for concurrent clamping of three or all four sides of the work, in which case two oppositely disposed L-shaped clamping means are employed. However, the clamping means need not necessarily have an L-shaped configuration. It may have any configuration, consonant with the principles of this invention which conforms to the individual configuration requirements of a given application.

Another obvious range of possibilities encompassed within the scope of the invention resides in the power drive. The preferred and illustrated power drive is an electrical motor with speed reducing gears. Conventional hydraulic and pneumatic power drives are obvious alternatives.

DESCRIPTION OF THE DRAWING

FIG. 1 is a front perspective view of a clamping means made in accordance with the present invention and applied to an air float table.

FIG. 2 is an enlarged fragmentary side view of said clamping means and air float table.

FIG. 3 is a plan view of the clamping means, the table top being removed for purposes of clarity.

FIG. 4 is a side view of a pair of conveyor systems and the work clamping means supported thereon, showing said work clamping means in retracted, storing position below the work supporting surface of the table.

FIG. 5 is a view similar to that of FIG. 4 but showing the work clamping means in partly elevated position laterally offset from the work supporting surface.

FIG. 6 is a view similar to that of FIG. 5 but showing the work clamping means in its uppermost position, still laterally offset from the work supporting surface.

FIG. 7 is a view similar to that of FIG. 6 but showing the work clamping means moved into elevated position above the work supporting surface and the work supported thereby.

FIG. 10 is a fragmentary view of the clamping means showing the limit switch which limits the clamping force exerted upon the work.

FIG. 10A is an enlarged, fragmentary section showing the limit switch which fixes the retracted position of the clamping means.

FIG. 12A is a schematic drawing showing the path of movement of each clamping element from its inoperative position below the work supporting surface to its operative position above the work supporting surface.

FIG. 12B is a schematic drawing showing the path of movement of each clamping element from its operative position above the work supporting surface to its inoperative position below said work supporting surface.

FIG. 13 is a fragmentary side view, similar to that of FIG. 4, showing a modified form of the invention.

FIG. 14 is a horizontal section on the line 14—14 of FIG. 13.

FIG. 15A is a schematic drawing showing the path of movement of each clamping element of the modified form of the invention, from its inoperative position below the work supporting surface to its operative position above the work supporting surface.

FIG. 15B is a schematic drawing showing the path of movement of each clamping element from its operative position above the work supporting surface to its inoperative position below said work supporting surface.

DESCRIPTION OF PREFERRED EMBODIMENTS OF THE INVENTION

Figure 8:
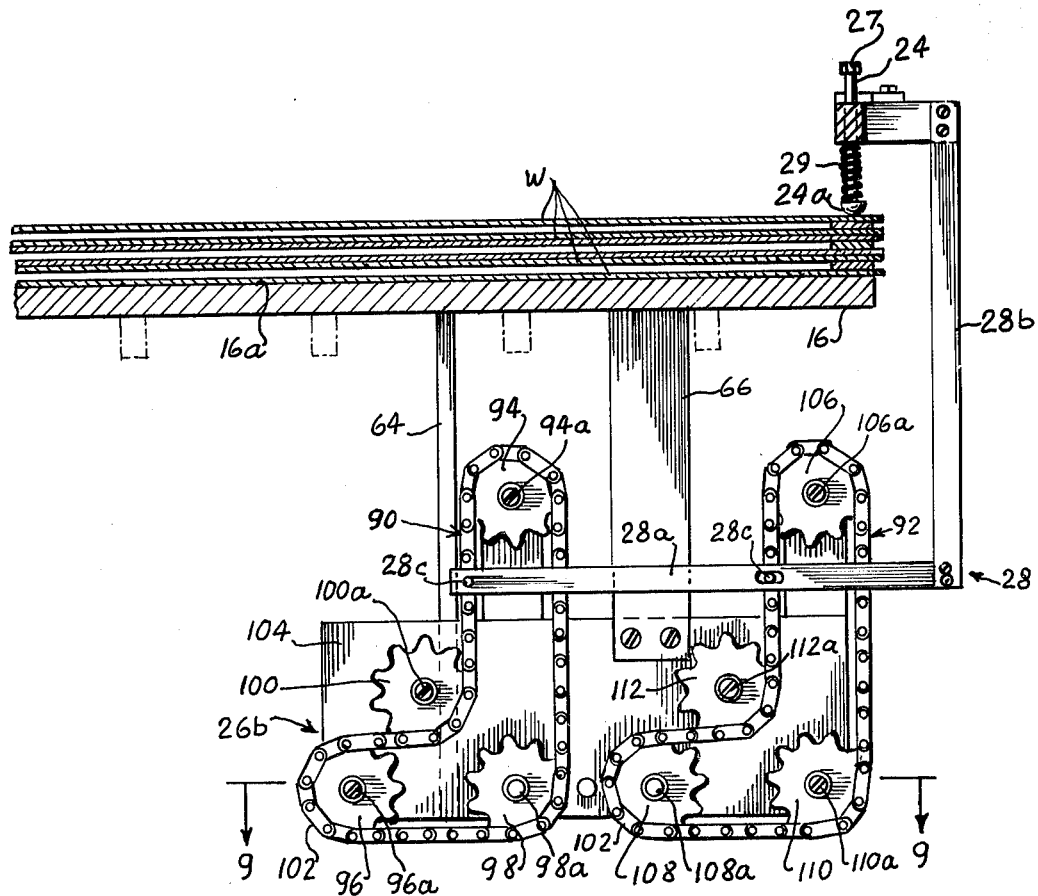
FIG. 8 is a view similar to that of FIG. 7 but showing the work clamping means in clamping engagement with the work by clamping same against the work supporting surface of the table.
Figure 9:
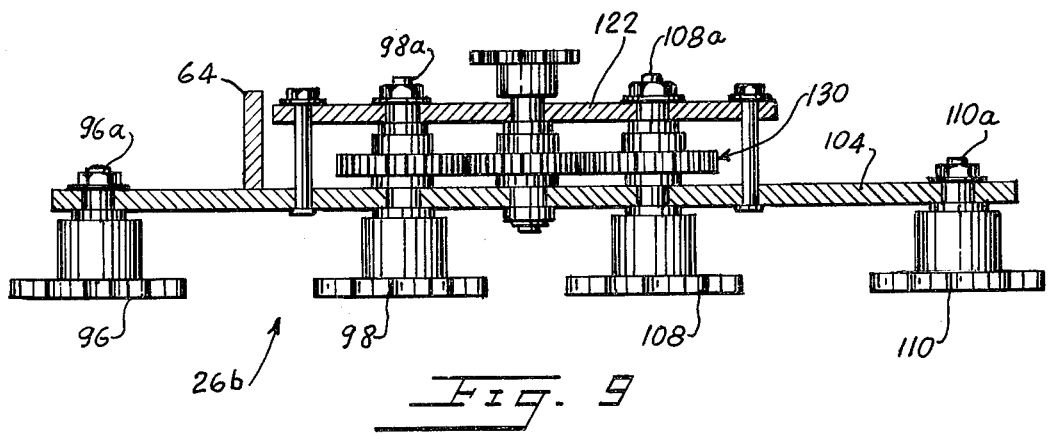
FIG. 9 is an enlarged horizontal section taken on the line 9—9 of FIG. 8.

Referring now to the details of the invention as illustrated in the drawing, and with particular reference to the first embodiment of the invention illustrated therein, it will be observed that the invention comprises two basic components, namely, a work clamping means 10 and an air float table 12 to which the clamping means is applied. The table may have any desired construction, configuration and dimensions, but essentially it comprises a supporting frame 14 and a table top 16 mounted on said supporting frame. Incorporated in the table top is a plurality of air jets 18 which are connected by conventional air lines 20 to a conventional source of compressed air. It will be understood that air is not the only fluid which is contemplated for use in connection with this invention. For example, if desired, a liquid, such as water, maintained under pressure, may be used in the place of the pressurized air.

The top surface of the table top 16 defines the work supporting surface of the table. As has above been stated, one of the primary uses of this invention is in the lamination of thermally insulated glass assemblies used in window and door constructions. The invention is applicable to other sheet laminates wherein bonding is required along extensive stretches of the work, usually marginal or peripheral stretches coinciding with the side edges of the work. Since the work is generally rectangular in shape so is the table and the size of the table is determined by the dimensions of the largest workpiece which the table is intended to accommodate. As has been stated, a 4'×8' table top will accommodate a 4'×8' lamination or stack of laminations, or laminations of smaller dimensions.

By the same token, the clamping means 10 must be dimensioned to correspond to the dimensions of the table top in order to provide a clamping capacity corresponding to the supporting capacity of the table. As has above been indicated, an L-shaped clamping means provides just such clamping capacity, wherein the length of one arm of the L-shaped configuration corresponds to the length of one side of the table and the length of the other arm of the L-shaped configuration corresponds to the length of one adjacent side of the table.

More specifically, the work clamping means 10 comprises an L-shaped floating framework 22, a plurality of spring biased plungers 24 supported on said floating framework, a plurality of synchronized conveyor systems 26, brackets 28 mounted on said conveyor systems and supporting said floating framework, and reversible drive means operatively connected to said conveyor systems for driving them alternately in opposite directions, said drive means including an electric motor 30 with speed reducing gears and means connecting same to the conveyor systems.

It will be observed that motor 30 is supported by a supporting frame 32 from the frame of the table. Although one form of supporting frame is shown it will be understood that this is purely illustrative and any suitable support may be used for the purpose. It will be seen in FIGS. 1 and 3 that the motor shaft is coupled by means of a clutch or coupling 34 to a main drive shaft 36. This main drive shaft is connected by means of a coupling or clutch 38 to one conveyor system 26a. A sprocket 40 on shaft 36 carries a sprocket chain 42 which is connected to a second conveyor system 26b. A second sprocket 44 on main drive shaft 36 supports a second sprocket chain 46 and said second sprocket chain 46 is also mounted on a third sprocket 48. This third sprocket 48 is secured to a second drive shaft 50 which is connected by means of a coupling or clutch 52 to a third conveyor system 26c.

It will be understood that the several conveyor systems above-mentioned, as well as the shafts, are supported by suitable conventional supporting means on the frame 14 which supports the table top. For example, brackets 60 and 62 support conveyor system 26a, brackets 64 and 66 support conveyor system 26b and brackets 68 and 70 support conveyor system 26c. There are also other supporting brackets, for instance, bracket 72 supporting shaft 36 and bracket 74 supporting shaft 50. Brackets 72 and 74 include suitable bearings for the shafts. The several brackets 60-74 are secured to frame 14 of the table in order to support the conveyor systems in proper relationship and orientation with respect to the table top 16.

More particularly, table top 16, in the illustrated form of the invention, has a rectangular configuration in plan view. The work supporting surface is designated by means of the reference character 16a and it is bounded by front and rear sides 80 and 82 respectively and left and right ends 84 and 86 respectively. Referring now to FIG. 3, it will be observed that shafts 36 and 50 extend in parallel relation to each other and on axes which intersect side 82 of the table at an angle of approximately 45 degrees. By the same token, the longitudinal axis of shaft 36 will intersect side 80 of the table top at an angle of 45 degrees and the longitudinal axis of shaft 50 will similarly intersect end 86 of the table top at substantially the same angle of 45 degrees. It will also be observed that the individual shafts of the individual gears and sprockets (hereinafter more fully described) of the conveyor systems are also parallel to shafts 36 and 50 and consequently their respective longitudinal axes intersect the sides and ends of the table top at substantially 45 degrees. This arrangement means that the several sprocket chains of the entire mechanism, that is, sprocket chain 42 which connects shaft 36 to conveyor system 26b, sprocket chain 46 which connects shaft 36 to shaft 50, and the individual sprocket chains (hereinafter more fully described) of the individual conveyor systems, all operate in parallel vertical planes which intersect the several shaft axes at right angles. It will be observed, therefore, that these various vertical parallel planes also intersect the sides and ends of the table top at an angle of approximately 45 degrees, so that the clamping means concurrently clear two adjacent sides of the table and concurrently clamp two adjacent sides of the work.

FIG. 2 of the drawing shows two of the conveyor systems of the machine, namely, conveyor systems 26a and 26b respectively. All three conveyor systems 26a, 26b, 26c are identical and a description of one is a description of all. Consequently, it will suffice to describe conveyor system 26a and the same reference characters will be applicable to the other two conveyor systems. As shown in FIG. 2, conveyor system 26a consists of two identical conveyor chain and sprocket assemblies 90 and 92 respectively. Assembly 90 comprises an upper sprocket 94, a pair of lower sprockets 96 and 98, an intermediate sprocket 100 and a sprocket chain 102 mounted on all four sprockets in the manner shown in the drawing. These four sprockets are, of course, mounted on individual shafts 94a, 96a, 98a and 100a respectively. These shafts are supported by conventional bearings on frame 104 of conveyor system 26a. This frame is shown, in FIG. 3, to be secured to brackets 60 and 62 which support said conveyor system on the frame of the table.

Chain and sprocket assembly 92 has the same arrangement of a conveyor chain and sprockets as conveyor system 90. Specifically, assembly 92 includes gears 106, 108, 110 and 112 mounted on shafts 106a, 108a, 110a and 112a. Mounted on these several sprockets is conveyor chain 114. Shafts 106a, 108a, 110a and 112a are supported by the same frame 104 which supports the shafts of assembly 90.

It will now appear from an inspection of these two assemblies 90 and 92, that their respective sprocket chains are provided with a horizontal run between the two lower sprockets, a vertical run between one of said lower sprockets and the upper sprocket, and a second vertical run between the upper sprocket and the intermediate sprocket. Each one of these runs is significant in the operation of the mechanism herein described and claimed.

Referring now to the several brackets 28 which support the floating framework 22 and the several clamping elements thereon, it will be noted that each of these brackets 28 has an L-shaped configuration defined by a lower horizontal bar 28 a and an upright 28b. Horizontal bar 28a is secured by means of bolts 28c to correspondingly located links of conveyor chains 102 and 108. Consequently, horizontal bar 28a remains horizontal regardless of the movement and position of said conveyor chains, and it will be understood that said horizontal bar moves integrally with said chains whether they move in one direction or the other. By the same token, upright 28b will always be maintained in upright position regardless of the movement and position of said conveyor chains.

As has been indicated, there are three conveyor systems 26a, 26b and 26c, and there are three L-shaped brackets 28 mounted on said conveyor systems, each said L-shaped bracket having a horizontal component 28a which is secured to the two conveyor chains of its conveyor system, and an upright 28b which supports the floating framework.

All three conveyor systems, carrying their respective L-shaped brackets 28, are driven by means of reversible motor 30 with its speed reducing gears. As shown in FIG. 3 motor 30 drives shafts 36 which drives a plurality of gears 120, said gears being mounted on shafts supported by frame 102 and bar 122. Two of said shafts are shafts 98a and 108a previously mentioned and it will therefore be understood that shaft 36 drives the several sprockets of the chain and sprocket assemblies of conveyor system 26a through gears 120.

Similar arrangements appear with respect to conveyor systems 26b and 26c. Thus, shaft 36 drives sprocket chain 42 which drives a plurality of gears 130 and said gears drive the chain and sprocket assemblies of conveyor system 26b. Shaft 36 drives shaft 50 by means of sprocket chain 46, said shaft 50 drives the chain and sprocket assemblies of conveyor system 26, all by means of gears 132. In short, all three conveyor systems operate in synchronized relationship, all being driven by the same drive shaft 36 and the same reversible motor 30 which drives said shaft. Since all three conveyor systems are provided with L-shaped brackets 28, these brackets will move in unison when the three conveyor systems are operated, whether forwardly or in reverse.

Electric motor 30, which drives all 3 conveyor systems by the means hereinabove described, is a reversible motor with speed reducing gears and a solenoid actuated, spring biased brake 30a. As will be understood from the appended circuit diagram (FIG. 11) the motor and the solenoid are synchronized in the sense that they are both concurrently energized or deenergized. When they are energized, the solenoid disengages the brake and the motor is thereby enabled to drive the conveyor systems. When the motor is de-energized at the conclusion of the operation of the three conveyor systems, the solenoid is also de-energized, thereby enabling the brake to re-engage and stop the motor driven mechanism. When it is desired to reactuate the conveyor systems, that is, to return them to their original positions, the motor is re-energized, but caused to operate in reverse direction, and the solenoid is concurrently re-energized to disengage the brake. This procedure alternates, the motor driving the conveyor systems first in forward direction and then in reverse direction.

With specific reference to FIGS. 4–8, it will be observed that the inoperative or storing position of the conveyor systems is such that brackets 28 are retracted to their FIG. 4 position, and with them the floating framework 22 and their clamping elements 24. It will be observed that brackets 28, floating framework 22 and clamping elements 24 are all positioned below the table top in their inoperative, storing positions. When motor 30 is energized, and with it the solenoid which controls the brake, the conveyor systems will be caused to operate and to move from their FIG. 4 to their FIG. 5 positions. Brackets 28 will now be seen to have been moved outwardly relative to the table top and partly upwardly. It will be observed in FIG. 5 that the upright section of brackets 28, the floating framework 22 and the individual clamping elements 24 have now cleared the edges of the table and are free to continue their upward movement. This is reflected in FIG. 6 where the continued movement of the conveyor systems brought brackets 28 to an elevated position wherein the floating framework 22 and the individual clamping elements 24 are raised above the level of the table top 16 and the workpieces W. Since the clamping elements 24 have now cleared not only the edges of the table top but also the top of the work, they are free to move inwardly to the position which is illustrated in FIG. 7.

In this position, the clamping elements 24 have been brought into an elevated position directly above the workpieces preparatory to clamping engagement therewith. Continued operation of the conveyor systems from their FIG. 7 to their FIG. 8 position lowers brackets 28 and floating framework 22 and brings the clamping elements 24 into clamping engagement with the workpieces, that is, they clamp the workpieces against the work supporting surface 16a of the table top. Actually, in this phase of the procedure, as has above been explained, the clamping operation is applied to only two sides of the workpieces.

At the conclusion of this phase of the clamping operation, that is, after two sides of the several sheets comprising the workpieces have been laminated together, the reversible electric motor is re-energized to operate the conveyor systems in reverse direction, and the sequence of action illustrated by FIGS. 4–8 is now reversed. The brackets 28, floating framework 22 and clamping elements 24 now move back from their FIG. 8 positions to their FIG. 7 positions, and thence to their FIG. 6 positions, and thence to their FIG. 5 positions, and finally to their FIG. 4 positions. The clamping elements have now released and cleared the laminated workpieces and the table top, and the workpieces are now free for 180 degree rotation so that the process may be repeated with respect to their remaining two side edges.

The foregoing sequence of events may also be understood from the schematic drawings which are designated FIGS. 12A and 12B. In FIG. 12A the operative tip 24a of each clamping element 24 is schematically represented by a circular symbol shown located in the inoperative storing position of said tip as represented in FIG. 4. Tracing the movement of tip 24a from its said inoperative storing position to its operative clamping position, a path of movement is described which is defined by line 24b. The arrowhead 24c at the upper end of line 24B represents the operative clamping position of tip 24a. Arrow 24d represents the direction of movement of tip 24a from its inoperative to its operative position.

FIG. 12B schematically traces the reverse movement of tip 24a of the clamping elements from its operative to its inoperative position, arrow 24e indicating the direction of such movement. Tip 24a is shown in its clamping position and arrow 24f represents its inoperative or storing position. Line 24g traces the path of movement of tip 24a from its operative to its inoperative position.

Referring now to FIGS. 10 and 10A, it will be observed that spring biased plungers 24 have a button-shaped tip 24a at the lower end of a shank 25, a head 27 at the upper end of said shank, and a compression spring 29 on said shank above tip 24a. Shank 25 extends through a vertical hole 31 formed in the floating framework 22 and it will be understood that said shank is free to move vertically in either direction in said hole. The lower end of spring 29 engages tip 24a and the upper end of said spring engages the floating framework 22 and the action of the spring is to bear downwardly upon tip 24a for the clamping operation hereinabove described. More specifically, when the floating framework is in its operative position with respect to the work, as shown in FIGS. 8 and 10, tip 24a of each of the plungers will bear down upon the work and clamp it to the work supporting surface 16a of table top 16. The individual springs 29 are equally tensioned to exert equal clamping forces upon the work.

As has above been explained, the invention provides means for adjusting the clamping force which is applied to the work. This is achieved by means of limit switch 140 which is adjustably secured to floating framework 22. It will be seen in FIG. 10 that switch 140 is vertically adjustable. Switch 140, in the illustrated form of the invention, is a single pole, double throw, normally closed, momentary switch. It controls the drive motor 30 and the solenoid actuated spring biased brake 30a. When the floating framework descends to its operative position above the work, tips 24a of the spring biased plungers will engage the work. The clamping force builds up as the floating framework 22 continues to descend and the spring elements 29 begin to compress. At a given point determined by the position of switch 140 on floating framework 22, the switch button 140a will engage the work, thereby actuating and opening the switch. This will cause the motor and the brake controlling solenoid to be de-energized, thereby stopping the motor and the floating framework 22. As will be understood, the solenoid controlled, spring biased brake acts upon the motor to bring it to a virtually instantaneous stop. The spring biased plungers now exert predetermined pressure upon the work to clamp it against the work supporting surface of the table.

Should it be desired to increase or decrease the clamping force exerted by the plungers upon the work, switch 140 is adjusted positionally by means of adjusting screw 140b. Thus, it is adjusted upwardly on floating framework 22 in order to increase the clamping force upon the work, and it is adjusted downwardly in order to decrease the clamping force upon the work. See FIG. 10.

A second limit switch 142 is provided to sense the retracted position of the floating framework. This switch 142, shown in FIG. 10A, is adjustably secured to the underbody of the table or to its supporting framework, whichever is better situated for the purpose of the operation of this switch. A switch actuating element 144 is secured to the floating framework 22 for engagement with the actuating button 142a of switch 142. This switch is a normally closed, cam actuated, momentary switch which is actuated when the floating framework 22 reaches its retracted, storing position as shown in FIGS. 4 and 10A. At this point, switch actuating element 144 engages button 142a and causes the switch to open. Once again, the circuit to the motor and to the brake controlling solenoid is opened and the operation of the motor ceases. Should it be desired to adjust the retracted position of the floating framework, this may be done by adjusting the position of switch 142. When adjusted leftwardly, as viewed in FIG. 10A, the switch will enable the floating framework to occupy a more leftward retracted position. When switch 142 is adjusted rightwardly, as viewed in FIG. 10A, it will enable the floating framework to occupy a more rightward retracted position.

Figure 11:
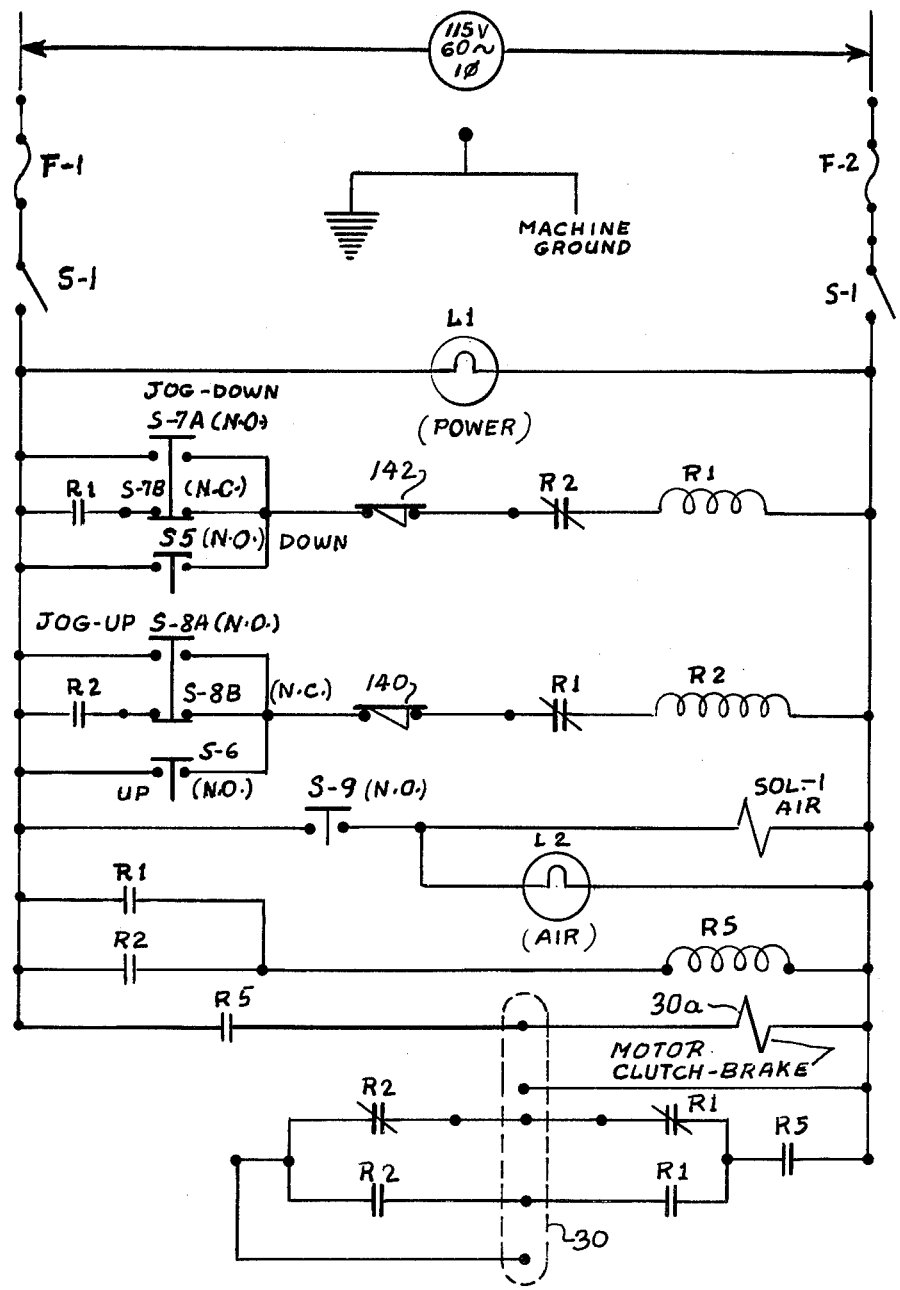
FIG. 11 is a circuit diagram showing the electrical components of the invention.

Other aspects of the operation of the machine will be discussed in connection with the circuit diagram, FIG. 11 of the drawing. Much of what is shown in the circuit diagram is, of course, conventional but is required for an understanding of the full operation of the machine. The following is the sequence of procedures in operating the machine, as illustrated in the circuit diagram: Switch S-1 is a double pole, double throw sustained contact switch and it is manually actuated to apply power to the machine. Switch S-6 is a normally open, single pole, double throw, momentary switch which is manually actuated to initiate the forward operation of the machine, that is, the operation leading to its clamping action. Closing of switch S-6 causes the motor and the brake controlling solenoid to be energized, thereby disengaging the brake from the motor and enabling the motor to operate the machine as hereinbefore described, advancing it from the stage illustrated in FIG. 4, through the stages illustrated in FIGS. 5 through 7, and finally reaching the stage illustrated in FIG. 8. At this point switch 140 is actuated and the motor and solenoid are de-energized. The brake will engage the motor and stop the mechanism at the desired clamping position of the spring biased plungers.

At the conclusion of this phase of the clamping action, wherein two sides of the work are clamped and laminated, it is necessary to retract the clamping mechanism in order to clear the table for rotation of the work to a second clamping position 180 degrees removed from the first. This may be done by manually operating switch S-7A, S-7B. Switch S-7A is normally open, switch S-7B is normally closed. The two switches comprise a momentary switch which is manually actuated for the jog mode of operation of the machine. More specifically, this switch operates as long as it is manually held in operation by the operator of the machine and what it does is to re-energize the motor and the brake controlling solenoid in order to cause the clamping mechanism to retract from its clamping position. The operator may wish to move it back to its FIG. 5 position, which is short of its fully retracted position. However, in the position illustrated in FIG. 5, the table is cleared for rotating the work. When the mechanism reaches this position the operator releases switches S-7A and S-7B, thereby de-energizing the motor and the brake controlling solenoid and causing the mechanism to stop in the position represented by FIG. 5.

Switch S-9 which is a sustained contact, single pole, double throw, normally open switch, is now actuated manually in order to close the circuit to the air valve solenoid SOL-1. This valve controls the flow of compressed air through the air conduit system 20 and air jets 18. A cushion of air will now elevate the work above the work supporting surface of the table and render it possible to rotate the work 180 degrees for the next clamping stage of the operation. Switch S-9 is now returned to its normally open position to de-energize solenoid SOL-1, thereby closing the air valve. The work now drops to the work supporting surface of the table and is ready for the next clamping operation.

The operator now activates jog-up switch S-8A, S-8B, the former being the normally open section of the switch and the latter being its normally closed section. This is a single pole, double throw momentary switch which is manually actuated to re-energize the motor and the brake controlling solenoid in order to return the clamping mechanism from its FIG. 5 position to its FIG. 8 position. Once again switch 140 takes charge and causes the mechanism to stop at the point of predetermined pressure of the spring urged plungers upon the work. Specifically, the motor and the brake controlling solenoid are de-energized to hold the clamping mechanism in the clamping position which is illustrated in FIG. 8.

At the conclusion of this second phase of the clamping operation, the operator once again manually operates the jog-down switch S-7A, S-7B and causes the clamping mechanism to retract from its FIG. 8 to its FIG. 5 position. Once again switch S-9 is actuated to energize solenoid SOL-1 and to open the air valve, thereby once again floating the work on a cushion of air. The work may now be moved off the table and additional work may be brought on to replace it. The entire procedure above described is now repeated in order to clamp the work for the two phases of the laminating operation.

When the several clamping and laminating operations are concluded and it is desired to return the clamping mechanism to its fully retracted storing position illustrated in FIG. 4, jog-down switch S-7A, S-7B is manually actuated until the clamping mechanism reaches its FIG. 4 position. At this point switch engaging element 144 will engage switch button 142a of switch 142 and cause the mechanism to stop, more particularly, causing the motor and the brake controlling solenoid to be de-energized.

Referring now to the second form of the invention as illustrated in FIGS. 13, 14, 15A and 15B, it will be understood that the basic mechanism and circuitry of the first form of the invention apply equally to the second form. The difference resides only in the conveyor systems which support and drive brackets 28 and the floating framework 22.

More specifically: conveyor systems 26a, 26b and 26c involve the use of two sprocket chains, each mounted on four sprockets. The second form of the invention also utilizes three conveyor systems, oriented in precisely the same manner as conveyor systems 26a, 26b and 26c, but each conveyor system of the second form of the invention utilizes two sprocket chains, each mounted on only two sprockets. See FIG. 13 wherein sprocket chains 150 and 152 are shown mounted, respectively, on upper and lower sprockets 154, 156 and upper and lower sprockets 158, 160.

The only functional difference between the operation of the mechanism shown in FIG. 13 and the operation of the machine previously described resides in the inability of the FIG. 13 machine to retract its clamping means to the full extent and capacity of the previously described machine. This is made clearly evident from a comparison of FIGS. 15A and 15B with FIGS. 12A and 12B. Once again, the path of movement of button tip 24a is described schematically, that is, by a line 162 which shows the movement of said tip from its retracted position below the table top to its operative clamping position above the table top, said operative position being represented by arrow 164. Arrow 165 indicates the direction of movement along path 162. FIG. 15B shows the reverse direction of movement wherein tip 24a moves from its operative clamping position back to its retracted storing position, this path of movement being described by line 166 and the final position of said tip being represented by arrow 168. Arrow 169 indicates the direction of movement along path 166.

The conveyor system mechanism of the second form of the invention is simpler than that of the first form of the invention and to that extent it provides advantages over the first form. However, as has been stated, the first form of the invention provides a more retracted position for the clamping means and in that sense it provides advantages over the second form. In all other respects the two systems are identical and both provide the advantage of clamping means which operate diagonally of the table, that is, at an angle of approximately 45 degrees to the clamping sides of the table, in order to move into or out of clamping position relative to both clamping sides concurrently.

The foregoing is illustrative of preferred forms of this invention and it will be understood that these forms may be modified, as needed, to fit different applications and to meet different requirements, all within the scope and coverage of the appended claims.

I claim:

1. Retractable clamping means for clamping sheet laminates and other forms of work, said clamping means comprising:
    (a) a table having a work supporting surface,
    (b) a plurality of spring-biased work clamping elements,
    (c) a floating framework supporting said work clamping elements in a substantially common plane and being movable integrally with them, and
    (d) reversibly driven carrier means carrying said floating framework and the work clamping elements supported thereby,
    (e) said carrier means being driven to move the floating framework and work clamping elements upwardly from retracted position below said work supporting surface, then downwardly to work clamping position above said work supporting surface, then upwardly from said work clamping position, and then downwardly back to said retracted position.

2. Retractable clamping means in accordance with claim 1, wherein the guided carrier means comprises:

(a) a plurality of conveyor systems having a reversible drive which operates said conveyor systems alternately in forward and reverse directions, (b) said conveyor systems comprising a plurality of sprockets driven by said reversible drive, conveyor chains mounted on said sprockets, and brackets mounted on said conveyor chains, (c) said brackets being movable with said conveyor chains as said conveyor systems are driven alternately in forward and reverse directions, (d) said floating framework being mounted on said brackets and being movable with them, when the conveyor systems are operated in forward direction, from retracted position below the work supporting surface of the table to work clamping position above said work supporting surface, (e) said floating framework being movable with said brackets, when the conveyor systems are operated in reverse direction, from work clamping position above the work supporting surface of the table to retracted position below said work supporting surface.

3. Retractable clamping means in accordance with claim 2, wherein:

(a) each conveyor system comprises a pair of conveyor chain and sprocket assemblies supporting a single bracket, (b) each conveyor chain and sprocket assembly having a single conveyor chain mounted on at least two sprockets, one a lower sprocket, the other an upper sprocket situated above the lower sprocket, both sprockets rotatably mounted below the work supporting surface of the table, (c) said bracket having horizontal and vertical components, (d) the horizontal component being supported by the conveyor chains of both conveyor chain and sprocket assemblies, (e) the vertical component comprising an upright support for the floating framework.

4. Retractable clamping means in accordance with claim 2, wherein:

(a) the paths of movement of said brackets on said conveyor chains, when the conveyor systems are driven in forward direction, are:

first, generally horizontal in outward direction to move the floating framework out from its retracted position below the work supporting surface of the table, second, generally vertical in upward direction to raise the floating framework to a position elevated above, but laterally offset from the work supporting surface, third, generally horizontal in inward direction to move the floating framework to a position elevated above its work clamping position above the work supporting surface, and fourth, generally vertical in downward direction to lower the floating framework to work clamping position above the work supporting surface, and (b) the paths of movement of said brackets on said conveyor chains, when the conveyor systems are driven in reverse direction, are:

first, generally vertical in upward direction to raise the floating framework to a position elevated above said work clamping position, second, generally horizontal in outward direction to move the floating framework to a position elevated above, but laterally offset from, the work supporting surface, third, generally vertical in downward direction to lower the floating framework to a position below, but laterally offset from, the work supporting surface, and fourth, generally horizontal in inward direction to move the floating framework back to its retracted position below the work supporting surface.

5. Retractable clamping means in accordance with claim 4, wherein:

(a) the guided carrier means comprises three conveyor systems situated adjacent three corners of the table, (b) said floating framework defining a pair of horizontal components joined to form an L-shaped configuration in plan view, one component corresponding to one side of the table between two of said corners, the other component corresponding to the adjacent side of the table extending to the third of said corners, (c) said floating framework being supported by the three brackets of said three conveyor systems, one bracket at each end of the framework and one at the juncture between its two horizontal components.

6. Retractable clamping means in accordance with claim 5, wherein:

(a) the three conveyor systems are oriented in parallel relationship, the paths of movement of their respective brackets extending through parallel vertical planes, (b) said vertical planes intersecting the vertical planes occupied by said two sides of the table at an angle of approximately 45 degrees.

7. Retractable clamping means in accordance with claim 4, wherein:

(a) each conveyor chain and sprocket assembly has two additional sprockets, namely, a second lower sprocket situated behind the first mentioned lower sprocket, and an intermediate sprocket situated above the two lower sprockets but below the upper sprocket, (b) the conveyor chain extending around the upper and lower sprockets such that they rotate in the same direction, (c) said conveyor chain extending around the intermediate sprocket such that it rotates in the opposite direction.

8. Retractable clamping means in accordance with claim 5, wherein:

(a) each of the two horizontal components of the L-shaped floating framework is provided with a plurality of work clamping elements for engagement with two sides of rectangular workpieces corresponding to said horizontal components, (b) said table having fluid float means operating through its work supporting surface for floating the workpieces above said surface, (c) whereby the rectangular workpieces can be rotated relative to the sides of the table to present the previously unclamped sides of said workpieces to the work clamping elements of the floating framework.

9. Retractable clamping means in accordance with claim 4, wherein:

(a) the work clamping elements comprise spring biased plungers oriented to exert spring action between the floating framework and the workpieces on the work supporting surface of the table, (b) adjustable limit means being provided on said floating framework for engagement with said workpieces to adjust the unit force exerted by the spring biased plungers upon the workpieces independently of the size and height of the workpieces, (c) said spring biased plungers being equally tensioned to exert equal unit force upon the workpieces regardless of the adjustment of the limit means.

10. Retractable clamping means in accordance with claim 9, wherein:

(a) the reversible drive which operates the conveyor systems is powered by a reversible electric motor having a solenoid controlled, spring biased brake, (b) said solenoid being normally de-energized and said brake being normally engaged, (c) the operation of the motor and solenoid being interlocked such that they are concurrently either energized or de-energized, (d) whereby the solenoid is energized to disengage the brake when the motor is energized to drive the conveyor systems, and the solenoid is de-energized to mechanically re-engage the brake when the motor is de-energized to stop the conveyor systems.

11. Retractable clamping means in accordance with claim 10, wherein:

(a) the adjustable limit means is an adjustable, normally closed, limit switch which is in circuit with the reversible electric motor and the solenoid which controls the brake, (b) said limit switch controlling the motor and solenoid such that it opens when it engages the work and thereby de-energizes both the motor and the solenoid to stop the operation of the conveyor systems, (c) whereby adjustment of the limit switch relative to the floating framework on which it is mounted adjusts the amount of plunger spring compression required to enable the limit switch to engage the work, (d) thereby adjusting the clamping force of the spring biased plungers upon the work independently of the height of the work stack.

12. Retractable clamping means in accordance with claim 11, wherein:

(a) a second normally closed limit switch is mounted on the underside of the table for engagement with a stop element on the floating framework when the conveyor systems are operating in reverse direction, (b) said second limit switch being engageable with said stop element when the floating framework reaches its inoperative storing position below the work supporting surface, (c) whereby the second limit switch is opened when actuated by the stop element and thereby de-energizes both the motor and the solenoid to stop the operation of the conveyor systems.

* * * * *